VARIABLE DISPLACEMENT PUMP

Original Filed Oct. 16, 1962 Sheet 1 of 4

INVENTOR
MICHAEL A. D'AMATO
BY James H. Littlepage
ATTORNEY

VARIABLE DISPLACEMENT PUMP

Original Filed Oct. 16, 1962

INVENTOR
MICHAEL A. D'AMATO
BY James H. Littlefield
ATTORNEY

VARIABLE DISPLACEMENT PUMP

Original Filed Oct. 16, 1962

INVENTOR
MICHAEL A. D'AMATO
BY Jamieson Littlepage
ATTORNEY

VARIABLE DISPLACEMENT PUMP

Original Filed Oct. 16, 1962

INVENTOR
MICHAEL A. D'AMATO
BY James H. Littlepage
ATTORNEY

United States Patent Office

Re. 26,519
Reissued Jan. 14, 1969

26,519
VARIABLE DISPLACEMENT PUMP

Michael A. D'Amato, 2905 Hillsdale Drive,
Urbandale, Iowa 50322

Original No. 3,175,510, dated Mar. 30, 1965, Ser. No. 230,940, Oct. 16, 1962. Application for reissue Mar. 29, 1967, Ser. No. 637,016
U.S. Cl. 103—162 6 Claims
Int. Cl. F04b *1/02*

Matter enclosed in heavy brackets [ ] appears in the original patent but forms no part of this reissue specification; matter printed in italics indicates the additions made by reissue.

*ABSTRACT OF THE DISCLOSURE*

*A variable displacement pump including a rotor mounted for rotation on a drive shaft which is journalled in the pump casing. Cylinders axially aligned in the rotor carry pistons which are spring loaded against canted swash plate. Arcuate intake and outlet ports in the pump casing communicate with the cylinders through cylindrical sleeves which are slideably received in counterbored recesses in the cylinders, the sleeves bearing against a wear plate which in turn bears against that casing surface which defines the arcuate ports.*

This invention relates to variable displacement fluid pumps and motors and, more particularly, to multi-cylinder pumps of the type in which a plurality of pistons move axially in a rotor with variable stroke lengths, depending upon the angle of disposition of a swash plate.

In swash plate pumps, wherein the ends of cylinders in a rotor rotate successively over an arcuate intake port, a blank area, an outlet port, another blank area, and then again the intake port, there are fundamental problems, one of which is to obtain and maintain good sealing relationship between the blank surfaces at the end of the rotor, in which the cylinders are formed, and the blank areas or sealing surfaces of the ported member or plate against which the end of the rotor slides. Taking into account the requirement that the rotor must be mounted, usually on a drive shaft, on bearings in the pump casing, the tolerances, including bearing play and vibration under load necessary for economic manufacture of the parts generally result in relative separation or canting of the sliding surfaces, thereby opening the seal between them. For maximum efficiency, the sealing surfaces should be absolutely flat against one another, and should be no farther apart than to accommodate a very thin film of oil on which the rotor end slides. If the sealing surfaces separate, leakage and short-circuiting of the pumped fluid, usually oil, occurs, thereby reducing efficiency. Canting of the rotor's end surface tends to set up localized areas of wear, either on the rotor end or on the ported member against which it slides, and before long either the rotor or the ported member must be replaced. Another important object is provision for use of a material for the rotor with wear and heat expansion characteristics which are compatible with the axial pistons, and a bearing material for the rotating wear plate which has quite different characteristics. The object now is to provide a wear plate mounted on the end of a pump rotor for rotation therewith, and having significant, however limited freedom of axial movement relative to the rotor. A further object is to provide torque transmitting sleeves slidably fitting in the ends of the cylinders and the ends of cylinder ports in the wear plate, and arranged to provide seals between the cylinder walls and the wear plate. By this arrangement it is intended to provide for the manufacture of the member having the inlet and outlet ports of large cross section, and also the rotor, of durable metal such as steel, and the rotating port plate of metal having excellent slide-bearing characteristics against steel, such as bronze.

Still another object relates to the formation of the ports so as to reduce cavitation to the minimum. In order that the pistons shall undergo intake strokes and suck in the pumped fluid during nearly half of one rotation of the rotor, and then exhaust the pump fluid during nearly all of the other half rotation, it is desirable that the inlet and outlet ports occupy elongate arcuate zones, and that they be long enough so that the cylinder ends register therewith during substantially their entire intake and exhaust strokes. It is also desirable to maintain, to the extent possible, a one-to-one relationship between the cross-sectional area of the inlet and outlet ports and the inlet and outlet openings, as well as the transitional fluid connections therebetween. To accomplish this within the practical limits of design and manufacture, the inlet and outlet ports assume the form of elongate arcuate slots. The cylinders, however, are round so as to be easily bored, honed, and fitted by the pistons, and because of other design considerations, the diameters of the cylinders are greater than the radial widths of the port slots. An additional object is to utilize the rotating wear plate as a member for providing transitional port shapes and surfaces between the round cylinder ends and the relatively narrow elongate arcuate inlet and outlet ports. Furthermore, because of the separable sealing sleeves and rotating wear plate, it is possible to bore and hone the cylinders by straight-through machining whereas otherwise it would be necessary to work the tools into blind inner ends of the cylinders.

Still another object is to provide, at the inner end of a rotary multi-cylinder pump, fixed and rotating wear plates having sealing lands and bleeder grooves for bleeding a predetermined minor amount of leakage to the bearings at the inner end of the rotor shaft and to the low-pressure side of the pump. Another object is to provide a tapered roller bearing for the outer end of the pump shaft, and to pre-load the pump shaft by light spring pressure on its inner end, thereby holding the tapered bearing members firmly against one another when the pump is idling and therefore not producing the reactive forces which prevent the tapered bearing members from chattering when the pump is under load.

These and other objects will be apparent from the following specification and drawings, in which.

Figure 7:
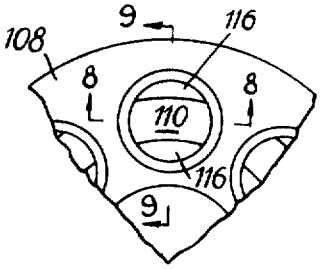
Figure 8:
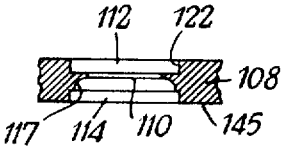
Figure 9:
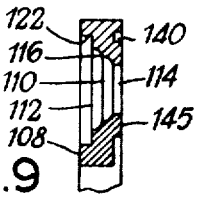

FIG. 7 is a fragmentary plan view showing a cylinder port in the rotating wear plate; and FIGS. 8 and 9 are fragmentary cross sections along the lines 8—8 and 9—9 of FIG. 7, showing the shape of the cylinder port.

Referring now to the drawings, in which like reference numerals denote similar elements, variable capacity pump 10 is enclosed within a casing 12 formed of two separable parts 14 and 16, respectively, connected by a joint 18 and held together by bolts 19. Casing 12 is generally cylindrical and centrally mounted therein is a drive shaft 20 having an outwardly projecting free end 21 arranged to be connected to a suitable torque source. The inner end of the drive shaft is rotatably supported by a roller bearing assembly 22 engaging in an annular recess 23 in casing part 16, the inner end of drive shaft 20 also engaging against an end thrust ball bearing assemby 24. A compression spring 26 engaging between the inner end of a bearing recess 27 and ball bearing race 28 provides an axially outward thrust against shaft 20 so as to hold it firmly against tapered roller bearings 29, thereby preventing chattering of the shaft and bearings when the pump is idling. A conventional seal 30 is provided for preventing leakage of the pump fluid outwardly from pump chamber 31. As seen best in FIGS. 1 and 5, casing part 16 is provided with an inlet 32 on one side and a diametrically opposed outlet 34.

Figure 1:
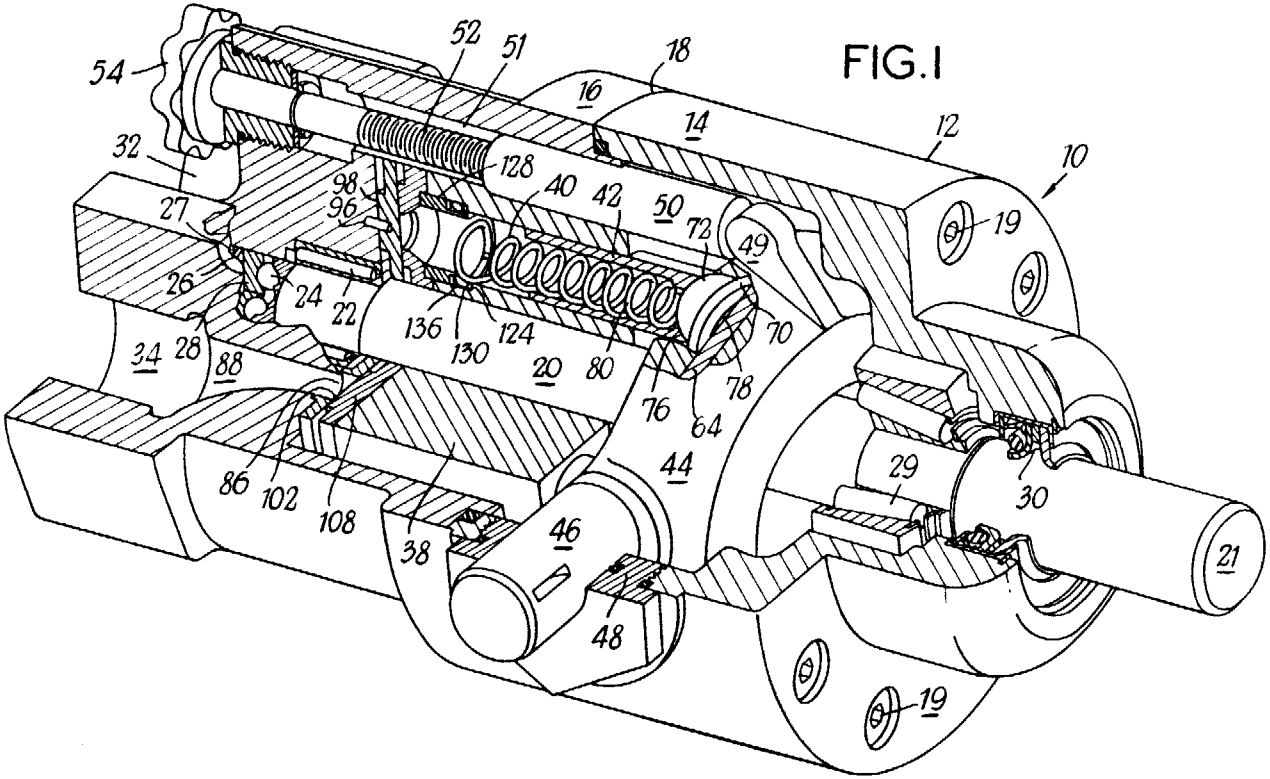
FIG. 1 is an isometric view of the pump, partly broken away.
Figure 2:
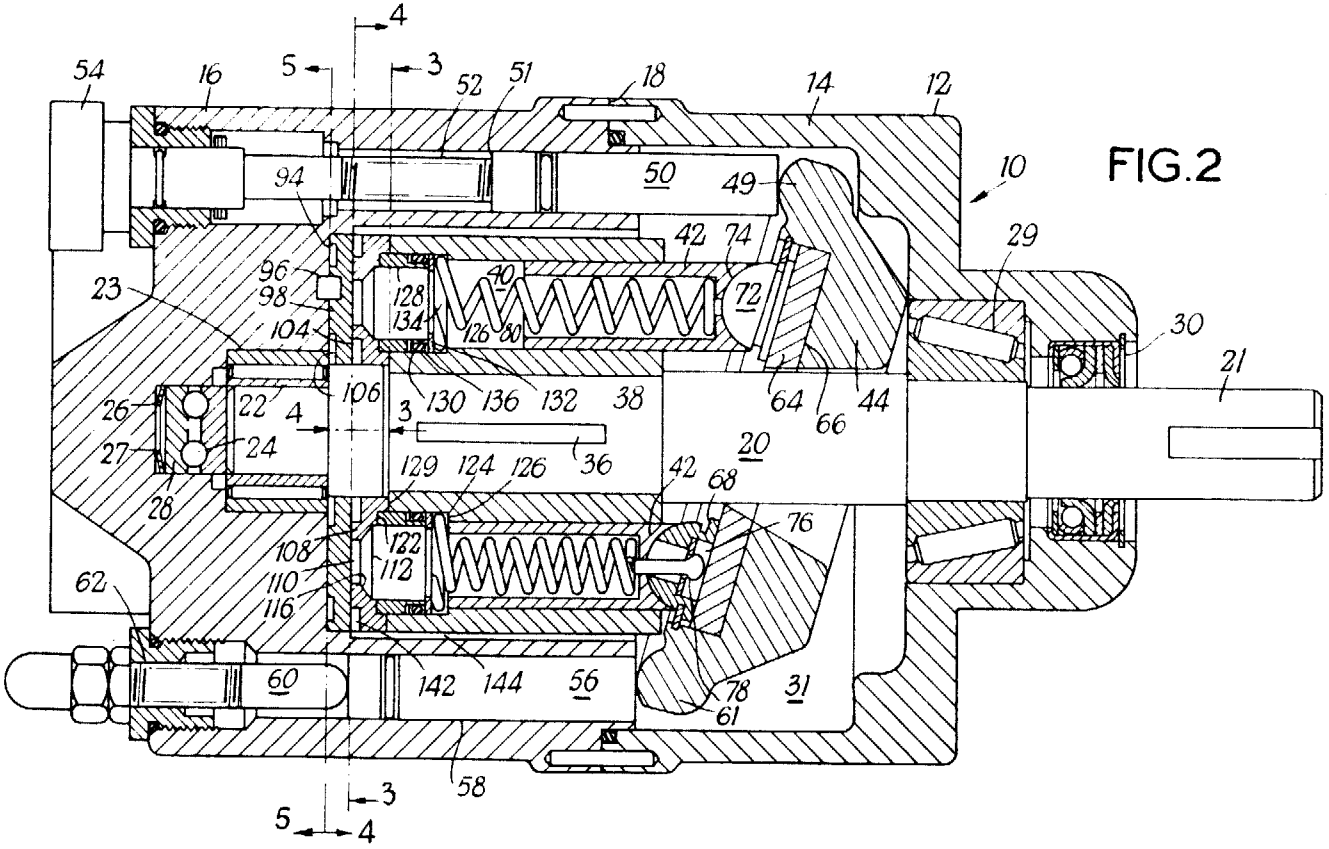
FIG. 2 is a longitudinal cross section through the pump, the section being somewhat sector-shape through the rotor in order to show the extreme positions of two of the seven pistons which are not exactly diametrically opposed.

Keyed, as at 36, to shaft 20 is a cylinder barrel 38 having seven axial cylinders 40 equally spaced therearound and extending from end to end therethrough. Sliding in outer end portions of cylinders 40 are hollow pistons 42 which are reciprocated, when shaft 20 is rotated, by a swash plate 44. As shown in FIGS. 1 and 2, plate 44 is adjustably supported by stub shafts 46 which project outwardly through bearings 48 on opposite sides of casing part 14. At 90° from stub shafts 46 on swash plate 44 are a pair of ears 49 and 61, ear 49 being engaged by plunger 50 which is slidable in a bore 51 adjacent one side of the casing, and which may be axially adjusted by a lead screw 52 turned by a hand wheel 54. On the opposite side of the casing, a back-up piston 56 is axially slidable in a bore 58, the back-up piston 56 engaging against a back-up adjustment rod 60 which is axially adjustable by a screw assembly 62. Bore 58 is connected by a duct (not shown) to the high-pressure side of the pump so that, when the pump is under load, back-up piston 56 presses firmly against ear 61, thereby exerting a force tending to hold the opposite ear 49 tightly against plunger 50.

Swash plate 44 is faced with a reaction plate 64 engaging in an annular recess 66 on its inner face, the reaction plate 64 being slidably engaged by piston shoes 68 whose flat surfaces 70 slide thereagainst. Piston shoes 68 have semi-cylindrical convex surfaces 72 slidably engaging, like knuckles, against semi-cylindrical concave surfaces 74 on the outer ends of pistons 42. It is noteworthy that piston shoes 68 are hollow, as at 76, and communicate with the hollow interiors of pistons 42 so as to achieve a hydraulic near-balance between the outer ends of the piston shoes 68 and reaction plate 64, the piston shoes thereby engaging against the reaction plate with but slightly more than enough pressure to effect a seal therebetween. Piston shoes 68 are loosely connected to the outer ends of pistons 42 by cotter pins 78 so that a free swiveling motion can occur between the piston shoes and the pi tons. Compression springs 80 within hollow pistons 42 provide the outward bias for the pistons.

When barrel 38 is turned by shaft 20, those of the pistons 42 which pass around the side of the pump in which the inlet 32 is disposed move outwardly against the surface of reaction plate 64 on swash plate 44, thereby drawing pump fluid into cylinders 40, and those of the pistons which are then passing around the side of the pump in which outlet 34 is disposed are cammed inwardly, thereby expelling the pump fluid through the outlet. The volume of fluid drawn into and expelled from the pump, with each rotation of shaft 20, depends upon the angle at which the swash plate 44 is disposed, it being obvious that when the surface of reaction plate 64 is normal to the axes of cylinders 40, no pumping action occurs, and when swash plate 44 is tipped to an extreme position as in FIGS. 1 and 2, maximum delivery occurs. Since the pump fluid is drawn inwardly and expelled via openings through surfaces at the inner ends of cylinders 40, and since these surfaces must slide against one another to achieve the necessary valving and porting, it is vital to avoid substantially leakage, since leakage, or poor sealing, may be due to necessary tolerances entailed in economic manufacture, or it may result from wear of the parts sliding against one another, or from axial movement of the rotor, or shaft vibration, it is evident that basic problems arise in the design of these parts which can be inexpensively machined but which nevertheless will maintain effective sealing against excessive leakage during the life of the pump. It is with these features that the subject invention is primarily concerned.

Referring particularly to the details illustrated in FIGS. 3 to 6, inclusive, inlet 32, which is circular at its outer end, passes inwardly through a transition 82 to an arcuate inlet port 84. It is desirable that the cross sectional area of transition 82 and inlet port 84 be similar, or nearly similar to the cross sectional area of inlet 32. On the opposite side of the pump is a similar outlet port 86, which likewise connects with outlet 34 via a transition 88. Between the ends of the arcuate inlet and outlet ports 84 and 86 are blank areas 90, 92, the center of the area 90 representing the dead center inward position of the pistons and the center of the area 92 representing the dead center outward position of the pistons. Fitting within a counterbore 94 in part 16 of the casing, and maintained against rotation by a pin 96 is a fixed wear plate 98, preferably of steel and having therethrough arcuate inlet and outlet slots 100, 102 respectively registering over inlet and outlet ports 84 and 86. The side 104 of fixed wear plate 98 disposed towards the cylinders is flat planar, whereas the side 106 disposed towards the bottom of counterbore 94 has lands and grooves for purposes described below.

Mounted upon and rotating with the inner end of barrel 38 is a rotating wear plate 108, preferably of bronze or the like material having good bearing properties for sliding against steel, and having cylinder ports 110 registering with the inner ends of cylinders 40. The ends 112 of cylinder ports 110, which are disposed towards the cylinders 40 are circular, whereas the ends 114 disposed towards fixed wear plate 98 are arcuate, the cylindrical and arcuate ends being connected by transitional bevels 116, 117. The arcuate ends 114 of the cylinder ports register with the arcuate inlet and outlet slots 100, 102 in the fixed wear plate but are much shorter, being but slightly less in angular extent than the blank areas between the ends of the inlet and outlet slots 100, 102, through the fixed wear plate 98.

Figure 6:
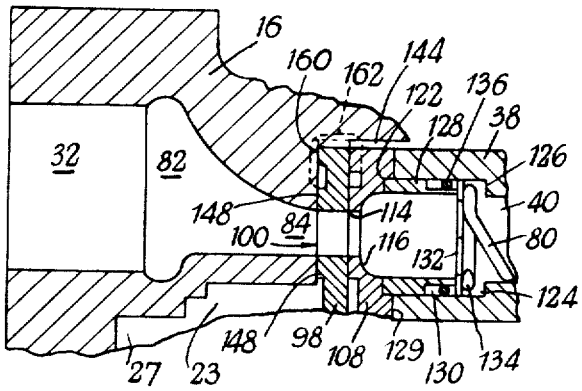
FIG. 6 is an enlarged fragmentary cross section, taken longitudinally through the inlet port, illustrating the sealing action of the parts.

As shown in large detail in FIG. 6, rotating wear plate 108 is counterbored at the circular end 112 of each cylinder port 110 to provide a seat 122. The inner ends of cylinders 40 are also counterbored to provide enlargements 124, each terminating in a shoulder 126, and a sleeve 128 slidably engages in both seat 122 and enlargement 124 and bridges the butt joint 129 between the inner end of barrel 38 and the adjacent side of wear plate 108. The outer side of each sleeve 128 is turned down, near its outer end, to provide a recess 130, and engaging over the outer end of each sleeve is a flat snap washer 132. The inner ends 134 of piston springs 80 abut against snap washers 132, and O-rings 136 are accommodated in recesses 130 to establish a fluid seal between the outer sides of sleeves 128 and the inner sides of cylinders 40. It should be noted that the maximum diameters of sleeves 128 are somewhat greater than the ends of the pistons 42 which they face so that a differential sealing pressure is exerted against the outer ends of the sleeves.

Sleeves 128 serve several basic functions, the first being to transmit torque from barrel 38 to the rotating wear plate 108. By forming the rotating wear plate and rotor separately, it is possible to utilize different metals, such as bronze for the rotating wear plate and steel for sleeves 128, barrel 38 and fixed wear plate 98. This also makes it possible to replace, if necessary, a single wearing member, rather than one of the larger components, such as the barrel, after extensive use of the pump. Also, by forming the rotating wear plate 108 and barrel 38 separately, it is possible to create the desired complex shape for ports 110, and it is also possible to hone cylinders 40 and enlargements 124 by straight through operations, rather than by working against blind inner ends of the cylinders. Most importantly, however, the slidability of sleeves 128 in seat 122 and enlargements 124 permit a slight freedom of motion between rotating wear plate 108 and barrel 38 so that the sealing surfaces on the inner side of the rotating wear plate can be maintained in flat sliding engagement against the flat planar surface 104 of fixed wear plate 98, even though the barrel 38, which is keyed to shaft 20, may undergo slight axial or tipping movements as a result of shaft deflection or vibration resulting from the bearings. Rotating wear plate 108 has a slight but nevertheless significant freedom of universal movement with respect to shaft 20, resulting from the minute play required for the sliding fit of sleeves 128 in enlargements 124 and seats 122.

Figure 3:
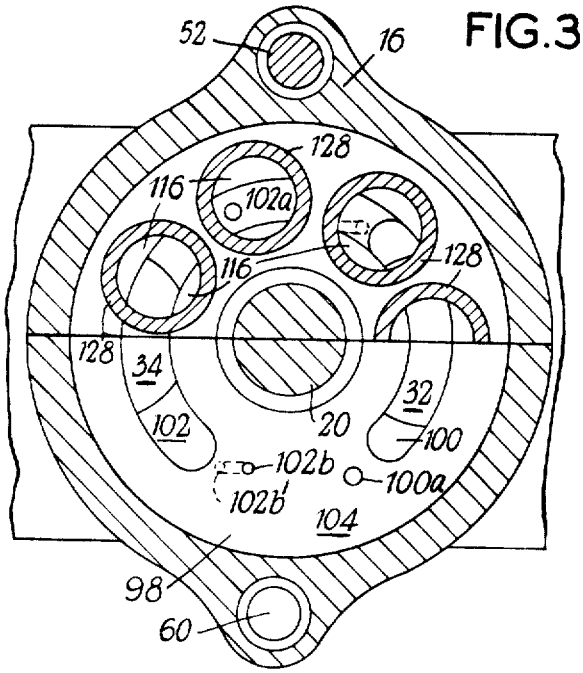
FIG. 3 is a transverse cross section along the line 3—3 of FIG. 2, looking in the direction of the arrows.
Figure 4:
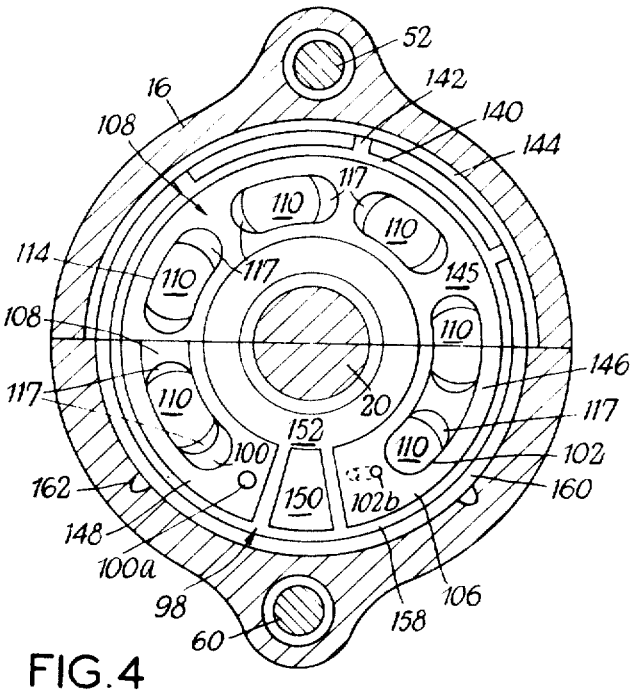
FIG. 4 is a transverse cross section along the line 4—4 of FIG. 2, looking in the direction of the arrows.

Referring now to the lower half of FIG. 3 and the upper half of FIG. 4, it will be observed that whereas the ends of ports 110 which face towards cylinders 40 are circular, the ends which face towards the flat side 104 of fixed wear plate 98 are arcuate and are chamfered at their ends to provide bevels 117 which form smooth transitions, in the annular direction of the port array, between the circular side and the arcuate side of the ports. As noted hereinbefore, the cylinder sides of ports 110 have beveled surfaces 116 which provide smooth transitions in the radial directions of the ports between their circular and arcuate sides. Surrounding and spaced radially outward from the inner sides of ports 110 is an annular groove 140 communicating with the periphery of rotating wear plate 108 via radial channels 142 for bleeding leakage to the portion 144 of the chamber in which barrel 38 is mounted, the chamber being bled to the low pressure side or intake port 34 via a duct (not shown). Surrounding the inner arcuate sides of ports 110 are flat sealing surfaces 145 which slide against the flat side 104 of fixed wear plate 98.

Referring to the lower half of FIG. 4, the land and groove side 106 of fixed wear plate 98, which engages against the flat plane surfaces of counterbore 94 (FIG. 5) is formed with flat segmental lands 146 and 148 which surround inlet and outlet slots 100, 102, respectively, and short segmental lands 150, the lands 146, 148 and 150 providing flat sealing surfaces. An inner annular groove 152 communicates with the recess 23 in which bearing 22 is housed, the inner annular groove communicating through radial grooves 156 with an outer annular groove 158 which surrounds lands 146, 148 and 150. A flat annular bearing land 160 surrounds outer annular groove 158, the latter being vented to the pump chamber space 144 via bleeder notches 162 formed in the outer side and periphery of counterbore 94. The bearings at the inner end of shaft 20 are thus lubricated by leakage fluid which eventually bleeds to the low pressure side of the pump.

A vitally important concept of the pump as a whole is the axial balance of forces while providing oil passageways to and from the cylinders the size of which are in excess of that which could be obtained in the conventional or common design and still maintain a hydraulically balanced or pressure loaded seal between the rotating and stationary plates at the port section of the pump. The above concept also provides two other very desirable auxiliary features: (1) the opportunity to use a ferrous metal in the cylinder rotor and a bearing metal in the rotating wear plate; and (2) the use of a tapered roller bearing for radial loading and axial orientation. The internal radial loading of this bearing is a result of the combined radial reaction of the pistons produced by the cam plate and the magnitude of this radial force is a function of the pressure being pumped. Because the permissable bearing radial load is proportional to the thrust load and the thrust load is also a function of the pressure being pumped, there results an ideal situation. The thrust or force against this bearing, neglecting that designed into it with the spring 26 for idling, is caused by the cylinder seal 128 being of greater cross sectional area than that of piston 42. This differential area multiplied by the fluid pressure equals this thrust force.

The common design for this type of pump is to float the cylinder rotor on a shaft with axial freedom. The pressure of oil behind a piston then forces the piston to the cam plate on one end and by reducing the opening from the piston chamber to the outlet port on the other end of the cylinder rotor is hydraulically forced to the port end of the pump. The size of the passageways leading to and from the piston chamber contacting the port openings are very critical to pump operation. If they are larger in cross sectional area than the pistons are, then the integral type cylinder rotor and port plate would be forced forward breaking the seal between these faces and the pump becomes inoperative. If they are small to maintain a good seal, the oil is choked from entering and leaving the piston, which limits the amount of oil the pump can pump using atmospheric pressure to fill the piston chambers.

The subject pump cylinder rotor is rigid with the drive shaft. By using rotating wear plate 108 which is hydraulically sealed to a mechanically oriented, not rigid with the cylinder rotor by cylinder seals 128, the disadvantages listed above for the conventional design are overcome. Oil passageways can be increased because the sealing forces between the port plate 98 and valve plate 108 is increased by the increase in size of the cylinder seal over that of the piston 42. The cylinder rotor now is forced via the shaft into the tapered bearing by this differential force.

Figure 5:
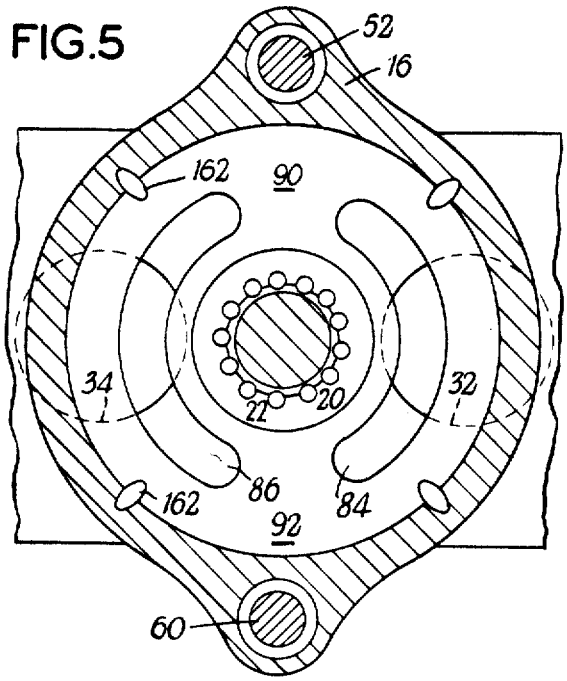
FIG. 5 is a transverse cross section along the line 5—5 of FIG. 4, looking in the direction of the arrows.

Another feature of fixed wear plate 98 is an arrangement which enhances greatly the quietness in the operation of the pump. To a large extent, noise in the pump is caused by the time rate of pressure change. Referring particularly to FIGS. 3, 4 and 5, it will be noted that the land space between the ends of arcuate outlet slots 100, 102 is considerably greater than the blank areas 90, 92 between the ends of the inlet and outlet ports 84, 86. Holes 100a and 102a are drilled through fixed wear plate 98 so as to locate the ends of slots 100, 102 with accuracy far beyond that obtainable with ordinary casting practice (also permitting the casting of the plates for both left and right-hand drive pumps).

When the arcuate end 114 of a cylinder port 110 is midway between the ends of slots 100, 102, and assuming swash plate 44 to be tilted, then, if the lands between the ends of slots 100, 102 were the same as the blank areas 90, 92, the cylinder port pressure would go from high to low pressure almost instantly. By using a more extensive land area between the ends of the inlet and outlet slots 100, 102, about 15° of rotation is required for a cylinder port 110 to go from the end of slot 102 to the start of slot 100. Small holes 100b, 102b, whose opposite ends 102b' are denoted in dotted lines, are drilled through the fixed wear plate which will permit enough transfer of oil to match the cylinder pre-compression on one side and the decompression on the other with that of the pressures existing within ports 100, 102, with resultant quiet operation of the pump.

Pumps constructed in accordance with the foregoing specification have high volumetric efficiencies high in the 90's while pumping pressures in excess of 3000 p.s.i. The unique porting design permits the minimum of internal oil velocity during maximum speeds, reducing inefficiency and excessive wear due to cavitation. Due to the extreme simplicity of the unit, the working parts are held to a minimum and those components subject to wear are self compensating to assure long, trouble-free performance under the most severe operating conditions.

The invention is not limited to the details illustrated and described herein, but is intended to cover all substitutions, modifications and equivalents within the scope of the following claims.

I claim:

1. In a fluid energy translating device, a casing defining a chamber having inner and outer ends, a port member affixed at the inner end of said chamber and having flat planar surface means facing the outer end thereof with inlet and outlet ports angularly spaced therein along arcs of a circle, a drive shaft extending from end to end through said chamber, bearing means rotatably supporting said drive shaft in said casing, a swash plate mounted in said chamber and spaced towards the outer end thereof from said port member, a cylinder barrel affixed on said shaft for movement therewith and having inner and outer ends respectively facing the port member and the swash plate, a plurality of cylinders angularly spaced about the rotative axis of the barrel and having inner and outer portions respectively disposed towards the port member and swash plate, pistons reciprocating in the outer end portions of said cylinder and having force transmitting means thereon engaging said swash plate for camming said pistons in one direction towards the inner end portions of said cylinders during one phase of rotation of said shaft, return stroke means for forcing said pistons in the opposite direction during another phase of rotation of said shaft, a rotating wear plate having an outer surface adjacent the inner end of said barrel and an inner surface slidingly engaging the flat planar surface means of said port member, said rotating wear plate having a plurality of passages therethrough having circular outer ends and inner ends respectively registering with said cylinders and said ports, [cylindrical seats in the outer surface of said wear plate respectively surrounding the outer ends of said passages,] *torque transfer means for coupling said wear plate for rotation with said barrel*, said barrel having right cylindrical enlargements of said cylinders at the inner end portions thereof, cylindrical sleeves having circular inner end and outer end portions slidably engaging [respectively in] said [cylindrical seats and] enlargements and constituting *both fluid seal means and a portion of the transitional fluid flow paths to and from the working chambers of said cylinders*, [combined fluid transmitting and fluid-seal means between said barrel and said rotating wear plate,] the inner diameters of the sleeves being substantially equal to *both* the diameters of the outer ends of said passages *and the diameters of said pistons, whereby the cross-sectional areas of said transitional flow paths are maintained substantially constant throughout their lengths to insure substantially uniform velocity of the fluid flowing in each of said paths at any instant.*

2. The combination claimed in claim 1, a terminal part of the outer side of the outer end portion of each of said sleeves being of reduced diameter with respect to the diameter of the cylinder enlargement in which the remainder of said outer end portion slidably engages and defining, between the outer side of the sleeve and the wall of the enlargement a cylindrical pocket, and an O ring seal in said pocket, said seal surrounding said reduced diameter part of the sleeve and engaging the wall of the enlargement.

3. The combination claimed in claim 1, *wherein said torque transfer means include cylindrical seats in the outer surface of said wear plate respectively surrounding the outer ends of said passages for slidably receiving the circular inner end portions of said cylindrical sleeves,* the combined axial lengths of each of said seats and said enlargements being greater than the axial lengths of said sleeves whereby the outer ends of said sleeves are spaced from the ends of said enlargements, said return stroke means including expansion springs operatively engaging between said pistons and the outer ends of said sleeves.

4. The combination claimed in claim 1, said bearing means comprising a radial thrust bearing supported in said casing at the inner end of the chamber, a tapered roller bearing supported in said casing at the outer end of said chamber, said tapered roller bearing having bearing members inclined to take shaft thrust in both the radial direction and those axially resultant from thrust against pumped fluid, and spring means operatively engaging between said casing and shaft for exerting an axial thrust thereon in the same direction as said axially resultant forces, whereby to pre-load said radial bearing when said pump idles.

5. The combination claimed in claim 1, the inner ends of said passages being elongate along arcs of the same circles as the inlet and outlet ports and of substantially equal radial extent as the inlet and outlet ports, the inner ends of said passages being substantially equal in cross-sectional area to the outer ends thereof and said passages being of substantially the same cross-sectional area from end to end.

6. The combination claimed in claim 5, said inner ends of said passages having arcuate lengths greater than the diameter of the outer ends and of less radial width than said inner ends, there being bevels constituting transitional surface between the inner and outer ends of the passages, thereby providing gradual emergence from the shape of the passage inner ends to the passage outer ends, whereby to reduce cavitation of liquid flowing at high velocity therethrough.

References Cited

The following references, cited by the Examiner, are of record in the patented file of this patent or the original patent.

UNITED STATES PATENTS

| | | | |
|---|---|---|---|
| 2,161,153 | 6/1939 | Doe et al. | 103—162 |
| 2,331,694 | 10/1943 | Jeffrey | 103—162 |
| 2,649,741 | 8/1953 | Henrichsen | 103—162 |
| 2,844,104 | 7/1958 | Wennberg | 103—162 |
| 2,953,099 | 9/1960 | Budzich | 103—162 |
| 2,992,619 | 7/1961 | Nilges | 103—162 |
| 3,191,543 | 6/1965 | Hann et al. | 103—162 |
| 2,365,067 | 12/1944 | Gauld | 103—162 |
| 2,619,041 | 11/1952 | Born | 103—162 |
| 2,646,754 | 7/1953 | Overbeke | 103—161 |
| 2,661,695 | 12/1953 | Ferris | 103—162 X |
| 2,963,983 | 12/1960 | Wiggerman | 103—162 |
| 2,972,962 | 2/1961 | Douglas | 103—162 |
| 3,124,079 | 3/1964 | Boyer | 103—162 |

FOREIGN PATENTS

| | | |
|---|---|---|
| 1,233,394 | 5/1960 | France. |
| 822,692 | 10/1959 | Great Britain. |
| 348,322 | 9/1960 | Switzerland. |
| 504,144 | 7/1930 | Germany. |
| 1,020,525 | 12/1957 | Germany. |
| 822,014 | 10/1959 | Great Britain. |

WILLIAM L. FREEH, *Primary Examiner.*